United States Patent [19]

Fogel et al.

[11] Patent Number: 5,783,062

[45] Date of Patent: Jul. 21, 1998

[54] PROCESS FOR THE TREATMENT, BY AN ELECTROCHEMICAL ROUTE, OF COMPOSITIONS CONTAINING PRECIOUS METALS WITH A VIEW TO THEIR RECOVERY

[75] Inventors: William Fogel, Ales; Yves Mottot, Tremblay en France, both of France

[73] Assignee: Rhone-Poulenc Chimie, Courbevoie, France

[21] Appl. No.: 691,057

[22] Filed: Aug. 1, 1996

[30] Foreign Application Priority Data

Aug. 4, 1995 [FR] France ................................. 95 09508
Nov. 10, 1995 [FR] France ................................. 95 13309

[51] Int. Cl.⁶ ................................................ C22B 7/00
[52] U.S. Cl. ................................. 205/718; 205/723
[58] Field of Search ............................. 205/718, 723

[56] References Cited

U.S. PATENT DOCUMENTS

| Re. 28,849 | 6/1976 | Itai et al. | 205/718 |
|---|---|---|---|
| 2,093,406 | 9/1937 | Aktinson | 205/718 |
| 4,132,569 | 1/1979 | Depablo | 134/3 |
| 4,775,452 | 10/1988 | Kuninaga et al. | 205/718 |
| 5,279,464 | 1/1994 | Heinz | 241/24 |

FOREIGN PATENT DOCUMENTS

| 0 039 873 | 11/1981 | European Pat. Off. | C25C 1/00 |
|---|---|---|---|
| 0 221 187 | 5/1987 | European Pat. Off. | C25C 1/20 |
| 0 363 314 | 4/1990 | European Pat. Off. | C22B 7/00 |
| 363314 | 4/1990 | European Pat. Off. | |
| 0 629 712 | 12/1994 | European Pat. Off. | C22B 1/06 |
| 629712 | 12/1994 | European Pat. Off. | |
| 43 31 948 | 4/1995 | Germany | C22B 7/00 |

OTHER PUBLICATIONS

Jom, vol. 40, No. 6, Jun. 1998, Warrendale US,pp. 40–44, XP002000920 Hoffman: "Recovering Platinum–Group metals from Auto Catalysts".

*Primary Examiner*—Arun S. Phasge
*Attorney, Agent, or Firm*—Katherine L. Carleton; Jean-Louis Seugnet

[57] ABSTRACT

The invention relates to a process of treatment for the recovery of the precious metals, such as platinum, rhodium and palladium, contained in various compositions including a layer of oxide(s) which is deposited on a metal support, in particular worn or spent motor vehicle postcombustion catalysts, in which the layer of oxide(s) containing the precious metals is separated from the metal support by an electrochemical route, the composition to be treated forming one of the electrodes employed or being in direct contact with one of the electrodes employed.

19 Claims, No Drawings

PROCESS FOR THE TREATMENT, BY AN ELECTROCHEMICAL ROUTE, OF COMPOSITIONS CONTAINING PRECIOUS METALS WITH A VIEW TO THEIR RECOVERY

The present invention relates to a process of treatment for the recovery of the precious metals, such as platinum, rhodium and/or palladium, which are present in various compositions, in particular motor vehicle postcombustion catalysts, including a layer of oxide(s), the said layer containing precious metals and being deposited on a metal support.

Precious metals like platinum, rhodium and palladium are widely employed, by themselves or jointly, in many industrial compositions, in particular catalytic compositions, this being optionally in combination with other valuable elements such as rare earths, for example cerium.

Examples of such compositions which may be mentioned more particularly are so-called multifunctional catalysts (or "three-way" catalysts) and especially the catalysts intended to treat and purify the exhaust gases from internal combustion engines, for example of motor vehicles (motor vehicle postcombustion catalysts). For reasons that are essentially linked with environmental protection, these have undergone considerable development in recent times (imposition of increasingly severe antipollution standards aimed at reducing harmful emissions, both of nitrogen oxides and carbon monoxide and of unburnt hydrocarbons).

The active part of the motor vehicle postcombustion catalysts, especially those which are in the form of monoliths, consists essentially of precious metals like platinum, rhodium and/or palladium, which are present in a layer of oxide(s), in most cases a layer of alumina and, optionally, of cerium oxide. This layer of oxide(s), including the precious metals, forms what is commonly known as a "wash coat" (or coating layer). The wash coat is deposited (or is impregnated) on a rigid support (or framework) which generally has a cellular structure.

Until recent times the motor vehicle postcombustion catalyst supports employed have been essentially ceramic supports, in particular supports based on a refractory ceramic such as a silicoaluminate (for example cordierite).

However, ceramic supports may exhibit a number of disadvantages. Thus, because of the fairly bulky nature of this ceramic material and of its thermal inertia which limits its rate of temperature rise, the catalyst becomes really efficient only at the end of a considerable time after the engine is started. In addition, the ceramic supports are sensitive to mechanical impacts and to thermal shocks.

Metal supports have come into use recently in an increasing proportion instead of ceramic supports in motor vehicle postcombustion catalysts. These metal supports offer a number of advantages when compared with ceramic supports: first of all they are less bulky; in addition, they offer more rapid heating up to the operating temperature during the cold starting stage; finally, they possess greater mechanical strength and better resistance to temperature changes.

In general, these metal supports are secured in a cylindrical metal enclosure provided with connecting conduits and exhaust gas inlet and outlet conduits; this enclosure and these conduits are in most cases made of stainless steel or of a nonmagnetic iron alloy. These metal supports are usually formed from a metal or, in most cases, a ferromagnetic alloy, based especially on iron, chromium and aluminium.

It is on the surface of this metal support, which is itself high, that a suspension of powdered oxide(s) is deposited (or impregnated), especially in order to enlarge this surface and to protect the support metal (or metals) from oxidation. The precious metals, like platinum, rhodium and palladium, are in general initially included in the suspension of powdered oxide(s) or are deposited subsequently on the layer of oxide(s).

At present, an enormous proportion of the platinum and rhodium which are consumed worldwide is employed for the preparation of catalysts intended for the motor vehicle postcombustion field. Bearing in mind, on the one hand, the proportionally very high cost due merely to the use of these precious metals when compared with the whole finished catalyst and, on the other hand, their rarity, their recovery from a spent or worn catalyst, especially with a view to recycling for the preparation of a new catalyst, today constitutes a major strategic objective for the industrialists involved.

The present invention falls within the context of this objective.

Numerous processes are known for recovering the precious metals contained in spent motor vehicle postcombustion catalysts, in particular those with ceramic supports. These are especially pyrometallurgical or hydrometallurgical processes (or wet chemical processes), generally carried out after grinding the catalyst.

In some pyrometallurgical processes employed in the case of the motor vehicle postcombustion catalysts with ceramic supports the support and its wash coat (containing the precious metals) are subjected to melting, generally in the presence of a collecting metal (for example copper, iron or nickel), the ceramic of the support being usually converted into slag; the precious metals which are concentrated in a metal phase can subsequently be extracted by a known wet chemical process. The use of pyrometallurgical processes of this type cannot be implemented directly in the case of the motor vehicle postcombustion catalysts with metal supports because there can be no separation of a metal phase containing the precious metals from a nonmetallic phase, since these catalysts consist virtually entirely of metals.

Some hydrometallurgical processes employed essentially in the case of motor vehicle postcombustion catalysts with ceramic supports can consist especially in leaching (or treating in an aqueous medium) the catalyst (or the powder obtained after grinding), once or more times, by means of strong inorganic acids such as sulphuric acid, nitric acid or hydrochloric acid, optionally in the presence of an oxidizing agent ($H_2O_2$, $Cl_2$, $HNO_3$ or other), by means of which one or more leachate solutions are obtained, containing in a dissolved form the various precious metals which are sought; the latter are next recovered from these solutions by any technique which is appropriate and known per se, in particular by selective precipitation. However, such processes have, in particular, the disadvantage of exhibiting, with regard to the various precious metals which are sought (platinum, rhodium and palladium), solubilization, and hence recovery, yields which may appear to be still insufficient, this being more particularly the case where the rhodium species is concerned. Another hydrometallurgical process does not exhibit the abovementioned disadvantage; this is the process described and claimed in Patent Application EP-A-0629712, which uses a sulphuric pasting operation (mixing the composition with sulphuric acid+calcining between 150° and 450° C.) followed by leaching with $H^+$ ions and with chloride ions.

Nevertheless, the actual application of these hydrometallurgical processes in the case of the motor vehicle postcombustion catalysts with metal supports can give rise to difficulties. In particular, toxic metals, such as chromium, which are generally present in these metal supports are then dissolved in company with the precious metals which it is intended to recover.

Patent Application EP-A-0605748 describes a process for the treatment of catalysts with metal supports, in which mechanical grinding of the catalyst is used in combination with drawing in by suction of the wash coat particles which are finer and less dense than the metal support and with a final purification by magnetic separation. Nevertheless, substantial quantities of base metals which are present in the metal support are entrained with the precious metals of the wash coat. Furthermore, wash coat particles remain trapped on the metal fragments and the recovery yields are limited as a result. In addition, the device used can turn out to be complex and costly, especially with regard to energy.

The process for recovery of the platinum group metals from motor vehicle postcombustion catalysts with metal supports which is proposed in Patent Application DE-A-4331948 includes a stage of separation of the wash coat from the metal support, consisting in treating the catalyst in an ultrasonic tank. However, the industrial implementation of a treatment using ultrasonics may be found to be difficult. It cannot produce the degree of result which is sought.

The aim of the present invention is especially to provide an effective alternative to the previous processes and to overcome the above problems, by proposing a novel industrially profitable process which makes it possible to recover, and to do so with fairly high yields, the different precious metals, in particular rhodium, which are present in various compositions, including a layer of oxide(s), the said layer containing precious metals and being deposited on a metal support, for example on motor vehicle postcombustion catalysts with metal supports.

To this end it is now proposed, according to the present invention, to separate the layer of oxide(s), containing the said precious metals, from the metal support by an electrochemical route, in this case by electrolysis, the composition (in particular the motor vehicle postcombustion catalyst with metal support) to be treated forming one of the electrodes which are employed or being in direct contact with one of the electrodes employed.

Thus, the subject-matter of the invention is a process for treatment of a composition including a layer of oxide(s), the said layer containing precious metals and being deposited (or impregnated) on a metal support (or framework), with a view to the recovery of the said precious metals, by separation (a) of the layer of oxide(s), containing the precious metals, from the metal support and then, optionally, post-treatment (b) of the layer of oxide(s) containing the precious metals, characterized in that the said separation (a) is obtained by electrolysis in a vessel subjected to an electrical current and containing at least one electrolyte and at least two electrodes, one of the said electrodes being formed by the composition to be treated or being in direct contact with the composition to be treated.

The process according to the invention, which is firstly a process for electrochemical stripping allowing the wash coat to be separated from its metal support, with a minimal or even nonexistent dissolving of the said support, can allow a selective or overall recovery of the species of the precious metal type, doing so with very satisfactory yields.

In particular, by operating via wet route, it allows a yield that is higher than those of the dry physical treatments.

In addition, it can be carried out by continuous operation.

Finally, dissolution of the metal support, which generally contains toxic metals such as chromium, is slight or even nil.

Other characteristics, aspects and advantages of the invention will emerge even more clearly on reading the detailed description which is to follow, as well as the various examples intended to illustrate it without any limitation being implied.

In the context of the present invention the expression "precious metals" is intended to denote and cover, taken individually or in combination, all the elements of the platinum group, that is to say the elements rhodium, palladium, iridium, platinum, ruthenium and osmium; more particularly, the precious metals are chosen from platinum, rhodium and palladium. Furthermore, the expression "valuable elements" refers essentially to rare earths possibly present in the layer of oxide(s), that is to say the elements of the lanthanide class whose atomic number is between 57 and 71 and more particularly cerium of atomic number 58, as well as yttrium of atomic number 39.

The compositions which are treated by means of the process according to the invention include a layer of oxide(s) deposited (or impregnated) on a metal support, the layer of oxide(s) containing precious metals.

These compositions generally consist of catalysts with metal support, which may be worn or spent, but also may be new or relatively new corresponding catalysts which constitute, for example, rejects from manufacture, or which have been damaged by an accident.

The process according to the invention is aimed more particularly at the treatment of the motor vehicle postcombustion catalysts with metal supports. Such catalysts may, for example, contain from 4 to 25%, especially from 5 to 15%, by weight of wash coat.

The catalysts to be treated are usually in the form of a monolith, the metal support generally having a cellular structure.

The metal support is usually made of a metal or of a metal alloy; it is based particularly on iron, chromium and/or aluminium. In most cases it consists of an alloy of iron, chromium and aluminium.

The layer of oxide(s) (or wash coat), which contains the precious metals, is generally a layer of alumina and/or cerium oxide. It is preferably alumina-based.

It may be noted that the catalysts of spent or worn type generally contain various impurities such as lead and carbonaceous or other substances; the process according to the invention is, however, insensitive to the presence of these impurities.

According to the essential stage of the process of the present invention the layer of oxide(s), containing the precious metals, is separated from the metal support by performing an electrolysis in a vessel into which an electrical current is introduced and which contains at least one electrolyte and at least two electrodes, the composition to be treated forming one of the said electrodes or being in direct contact with one of the said electrodes.

The wash coat is thus separated off from its metal support in order preferably to recover the wash coat in solid form while avoiding as much as possible any dissolving in the electrolyte.

It seems, without the Applicant Company being constrained by this theory, that the metal support makes it possible, by its presence, to ensure the absence of real and significant dissolving of the precious metals in the electrolyte; in the event of one of the precious metals dissolving, it would immediately react with the support to become insoluble again (cementation phenomenon).

The structure and the material of the vessel in which the separation is performed may be of any kind. This vessel may consist of an electrolysis cell.

Even though the use of a basic electrolyte, such as sodium hydroxide, is not excluded from the present invention, it is found that, in a basic medium, the layer of oxide(s) (or wash coat) is detached slowly and the metal support undergoes some dissolution.

Consequently, an acidic electrolyte, especially of pH lower than 4, or even than 3, is advantageously employed.

The wash coat then separates more rapidly and efficiently from the metal support and no significant dissolving of the metal support is observed.

In general, the electrolyte employed is an aqueous solution of at least one organic or inorganic salt, especially a sodium salt (for example sodium sulphate or chloride) or, preferably, a salt of at least one organic or inorganic acid. Very preferably, the electrolyte employed is an aqueous solution of at least one inorganic acid chosen, in particular, from sulphuric acid, nitric acid or hydrochloric acid. In particular, an aqueous solution of hydrochloric acid may be employed which has particularly a normality of between of 0.1 and 2N.

An essential characteristic of the process according to a first alternative form of the invention lies in the fact that one of the electrodes employed is formed by the composition to be treated, for example by the worn or spent motor vehicle postcombustion catalyst with metal support.

An essential characteristic of the process according to a second (preferred) alternative form of the invention lies in the fact that the composition to be treated, for example the worn or spent motor vehicle postcombustion catalyst with metal support, is in direct contact with one of the electrodes employed; in particular, the composition to be treated can then be secured to one of the electrodes, especially in its extension; the composition to be treated may also be simply placed or deposited on one of the electrodes.

The polarity of the electrode formed by the composition to be treated or in direct contact with the composition to be treated, that is to say, in the later case, the polarity of the combination formed by the said electrode and the composition to be treated (it being possible for this combination to be considered as a particular electrode) has a very great influence on the effectiveness of the separation of the wash coat from the metal support.

In particular, when the electrolyte is an acidic electrolyte, when the composition to be treaters is used at the cathode (that is to say when the said composition forms the cathode or is in direct contact with the cathode), the strong release of hydrogen at this cathode (first alternative form) or at the combination formed by the cathode and the composition to be treated (second alternative for) does not always make it possible to unbond the wash coat from its metal support in a completely satisfactory manner.

Consequently, even though the use of the composition to be treated at the cathode is not excluded from the present invention, the said composition is very preferably employed at the anode. This use of the composition at the anode (that is to say when the composition forms the anode or is in direct contact with the anode), in particular with an acidic electrolyte, is found to be the most effective: it allows the wash coat to be separated off from its metal support in a completely satisfactory manner.

It should be noted that the use of the composition to be treated alternately at the anode and at the cathode, that is to say the use alternately as anode and as cathode of the electrode formed by the said composition or which is in direct contact with the said composition, can be envisaged and gives relatively satisfactory results.

The actual electrodes (especially the counterelectrode in the case where the other electrode is formed by the composition to be treated) may be of any suitable type. They may thus be composed of graphite, of carbon, of stainless steel, of another conductive alloy etc. One of them can also be formed by the vessel itself in which the separation (a) is performed.

The separation of the layer of oxide(s) from the metal support, especially when the composition to be treated is employed at the anode (that is to say when the electrode formed by the composition to be treated or with which the composition to be treated is in direct contact is the anode), is generally correspondingly more efficient the higher the current density applied in the vessel. However, an excessively high current density can result in the simultaneous dissolving of the composition to be treated (anodic dissolving). The current density applied in the vessel is usually between 0.1 and 15 A/dm$^2$, preferably between 1 and 15 A/dm$^2$ and in particular between 1 and 10 A/dm$^2$, especially when the composition to be treated is employed at the anode.

The duration of the electrolysis used may be, for example, between 5 and 60 minutes, especially between 5 and 45 minutes. It may be performed with stirring.

Before the separation stage, the composition to be treated, especially when consisting of a motor vehicle postcombustion catalyst with metal support, may undergo a conditioning pretreatment.

This pretreatment may, for example, consist in ridding the catalyst of the metal enclosure surrounding it, this being done by cutting it out.

It may also consist of a transverse cutting of the unit formed by the catalyst and the metal enclosure which surrounds it.

It may also possibly consist in shredding, by shearing, the unit formed by the catalyst and the said enclosure.

The pretreatment, which in general does not consist of a very fine grinding of the catalyst, is usually applied in order to make the catalyst more easily accessible to the electrolyte.

After its separation from the metal support the solid wash coat which is present in the electrolyte may be recovered simply by any appropriate method; the electrolyte containing the wash coat may, in particular, be subjected to a solid/liquid separation according to any known process (for example filtration).

The posttreatment (b) of the layer of oxide(s) (or wash coat), which is an optional stage of the process according to the present invention, may be performed by any suitable method for recovering the sail precious metals and, optionally, the other valuable elements, such as cerium, which are present in this layer of oxide(s), in particular by any known pyrometallurgical or hydrometallurgical process (or wet chemical process).

The posttreatment (b) of the layer of oxide(s) is preferably applied according to the process described and claimed in Patent Application EP-A-0629712, the teaching of which is incorporated here by way of reference. This posttreatment (b) then includes the following successive stages:

(i) the said layer of oxide(s), containing the precious metals, is optionally brought into a finely divided state, (ii) it is mixed with sulphuric acid, (iii) the mixture thus obtained is then calcined at a temperature of between 150° and 450° C., (iv) and, finally, the product thus calcined is treated in an aqueous medium (leaching), simultaneously or separately, with, on the one hand, H$^+$ ions and, on the other hand, chloride ions, whereby there are finally obtained, on the one hand, a solid residue substantially depleted in precious metals and, optionally, in other valuable elements, and, on the other hand, one or more solutions containing the abovementioned species.

The combination of the above stages (ii) and (iii) corresponds to an operation which is called "sulphuric paste formation" in Patent Application EP-A-0629712.

According to a first optional stage (i), grinding of the wash coat containing the precious metals and, possibly, cerium (or other valuable elements) is carried out.

According to another optional stage, the wash coat, optionally after grinding, may be subjected to a thermal pretreatment conducted under reducing atmosphere, for example under a mixture of argon and hydrogen, this being done at a temperature which is generally between 300° and 800° C.

According to stage (ii) the layer of oxide(s), optionally in powder form, is next mixed intimately with sulphuric acid. The quantity of sulphuric acid, expressed as pure $H_2SO_4$, to be employed in this stage generally corresponds to approximately 0.4 to 5 times the mass of wash coat to be treated, and is preferably between 0.5 and 2 times this mass and, still more preferably, between 0.8 and 1.5 times this mass. In most cases the sulphuric acid is used in the form of a solution, generally aqueous, the latter being preferably relatively concentrated, that is to say that its content is higher than 50% by weight and, still more preferably, more than 80% by weight, of sulphuric acid. It is also possible, of course, to make use of sulphuric acids diluted in other solvents or of pure sulphuric acid.

After the above products have been mixed until a composition is formed and obtained which is more or less solid and which, in fact, in most cases has the appearance of a greyish paste, the resulting physical mixture is next calcined, generally in air (stage (iii)).

This calcination is conducted at a temperature of between 150° and 450° C., in particular between 200° and 400° C., this being for a sufficient time (which depends in particular on the quantity of wash coat converted into paste) to obtain finally a whitish, brittle solid which is here called "baked sulphates".

During this stage, known as sulphuric paste formation, chemical reactions are initiated and take place in the mixture based on wash coat and on sulphuric acid. In particular there are observed, on the one hand, the release of acidic white fumes originating from the decomposition of the sulphuric acid and, on the other hand, the conversion of the chemical species present as sulphates.

In accordance with another characteristic the precious metals, and possibly the valuable elements, which are present in the composition originating from the sulphuric paste formation stage must next be leached (stage (iv)).

This leaching may then be carried out according to two alternative forms.

According to the first alternative form the baked sulphates are first of all leached with an acidic solution. This first leaching, which is preferably conducted at a temperature of at least 50° C., is next followed by a filtration which thus makes it possible to obtain, on the one hand, a first filtrate and, on the other hand, a first solid residue. This first filtrate (acidic sulphate solution) then contains most of the cerium (at least 70%) and of the rhodium (approximately two thirds) which were initially present in the wash coat but is, in contrast, substantially free from any platinum. Then, in a second stage, a leaching of the said first residue is carried out, this time with a solution containing chloride ions and, preferably, an oxidizing agent. After digestion, the resulting suspension is filtered and thus produces a second filtrate and a second solid residue. This second leaching, which is preferably performed with the solution boiling, makes it possible, for its part, to dissolve and to recover in the second filtrate (acidic chlorosulphate solution) most of the platinum which was present in the starting wash coat, as well as the remaining quantities of cerium and of rhodium which were not leached during the first operation. It is appropriate to note here that the first or second solid residues referred to above may be washed with water or an acidic aqueous solution so as to recover the impregnating liquors and possibly the small quantities of platinum or rhodium which are still adsorbed; in this case, the aqueous wash(es) are then mixed with the first and second filtrates respectively. Finally, it will be noted that the second residue may additionally be optionally recycled either to the paste formation stage or to the first leaching stage, or to the second leaching stage.

According to a second alternative form, which is here also preferred to the first, the baked sulphates are leached with a single acidic solution containing chloride ions and, preferably, an oxidizing agent. This leaching is preferably performed at a temperature of at least 50° C. and, still more preferably, with the solution boiling.

In this case, after leaching, a suspension is obtained, which is next filtered, and this gives, on the one hand, a filtrate which then contains all the precious metals and the cerium which were present in the starting wash coat and, on the other hand, a solid digestion residue.

When compared with the first alternative form described above, this second alternative form has the advantage of making it possible to dissolve the precious metals and cerium simultaneously, in a single stage and with very high yields.

It will be noted, furthermore, that all the considerations expounded upon in the context of the first alternative form relating to the possibilities of washing(s) and/or of recycling (s) of the digestion residues are similarly applicable to the second alternative form.

Examples of oxidizing agents which can be employed on their own or as mixtures and which may be mentioned more particularly are hydrogen peroxide, nitric acid, chlorine, sodium persulphate and oxygen.

The chloride ions, for their part, may be introduced in the form of hydrochloric acid, of gaseous chlorine or of salts, for example of alkali and/or alkaline-earth metal chlorides, such as sodium chloride, potassium chloride, calcium chloride and ammonium chloride.

Finally, the necessary acidity which is linked with the leaching solutions to be used may be introduced by means of numerous acids, in particular the strong mineral acids such as sulphuric acid, nitric acid or hydrochloric acid. The concentrations of acid in the initial leaching solutions are then determined so that the pH of the solutions obtained directly after the leaching stage (second alternative form) or stages (first alternative form) is still lower than or equal to 2, and preferably lower than or equal to 1.

The precious metals, and optionally the cerium, present in the solutions originating from the leaching stages described above can next be recovered from the latter by any technique which is suitable and known per se, in particular by precipitation, cementation, liquid-liquid extraction or ion exchange, and then optionally may be purified. The precious metals and/or the cerium thus obtained can then be used again especially for the manufacture of new catalysts.

The following examples illustrate the invention without, however, limiting its scope.

In these examples tests are carried out on a motor vehicle postcombustion catalyst of monolithic form in which the proportion of wash coat (including the precious metals) relative to its metal support (Fe/Cr/Al alloy) is 15% by weight.

The catalyst is cut into slices of 20 mm thickness.

Electrolyses are then carried out in an electrolysis cell subjected to an electrical current and containing an electrolyte. Two electrodes are immersed in this electrolysis cell, one of these electrodes being formed by the catalyst itself, the other being made of graphite.

All the tests are performed for a constant period of 10 minutes.

The recovery yield, which is expressed as a mass percentage of wash coat separated, relative to the initial theoretical mass of wash coat, is noted.

EXAMPLE 1

Various electrolytes are employed here.
The current density applied is 5 A/dm$^2$.
The catalyst is employed as anode.
The following results are obtained:

| Electrolyte | 0.1N HCl | 0.5N HCl | 1N NaOH |
|---|---|---|---|
| Yield | 95% | 95% | <25% |

A strong release of hydrogen is observed at the cathode.

In an acidic medium the solution contained in the electrolysis cell remains clear; the change in the mass of catalyst corresponds to the mass of the solid recovered at the bottom of the cell, which shows that there is no significant dissolving of the metal support.

In a basic medium it is found that the wash coat separates off more easily; in addition, the appearance of swirls of rust which are characteristic of the formation of ferric hydroxide is observed, thus indicating some dissolving of the metal support.

EXAMPLE 2

The electrolyte employed is 0.5N hydrochloric acid.

The catalyst is employed as anode, as cathode (with a current density of 5 A/dm$^2$) or alternatively as anode and as cathode, while 1-minute periods of constant current densities of +/− 5 A/dm$^2$ are applied. The total duration of current flow in the three cases is always 10 minutes.

The following results are obtained:

| Catalyst | Anode | Cathode | Alternation |
|---|---|---|---|
| Yield | 95% | <10% | 70% |

When the catalyst is used as cathode, the considerable release of hydrogen does not allow the wash coat to be separated off as efficiently.

EXAMPLE 3

The electrolyte employed is 0.5N hydrochloric acid.
The catalyst is employed as anode.
Various current densities are applied.

| Current density | 2 A/dm$^2$ | 5 A/dm$^2$ |
|---|---|---|
| Yield | 65% | 95% |

In all these examples the precious metals present in the wash coat can next be recovered by subjecting the said wash coat to the process described in Patent Application EP-A-0629712.

We claim:

1. A process for the treatment of a composition including a layer of oxide(s) containing precious metals and being deposited on a metal support, with a view to the recovery of precious metals, comprising the step of:

(a) separating the layer of oxide(s) containing the precious metals from the metal support, wherein said oxide(s) being alumina or cerium oxide, and said separation being obtained by electrolysis in a vessel subjected to an electrical current and containing at least one electrolyte and at least two electrodes, an anode and a cathode and the composition to be treated is formed by one of said electrodes or is in direct contact with one of said electrodes.

2. A process according to claim 1, further comprising the step of: (b) subsequently posttreating the layer of oxide(s) containing the precious metals.

3. A process according to claim 2, wherein the step (b) comprises the following successive stages:

(ii) mixing the layer of oxide(s), containing the precious metals, with sulphuric acid, (iii) calcining the mixture obtained in stage (1) at a temperature of between 150° and 450° C., (iv) finally treating the product thus calcined in an aqueous medium, simultaneously or separately, with, on the one hand, H$^+$ ions and, on the other hand, chloride ions, whereby there are finally obtained, on the one hand, a solid residue substantially depleted in precious metals and, on the other hand, one or more solutions containing the said precious metals.

4. A process according to claim 3, wherein the step (b) further comprises the first following stage:

(i) dividing into a finely state the said layer of oxide(s).

5. A process according to claim 1, wherein the electrolyte is an acidic electrolyte.

6. A process according to claim 1, wherein the electrolyte is an aqueous solution of at least one organic or inorganic salt of at least one organic or inorganic acid.

7. A process according to claim 1, wherein the electrode formed by the composition to be treated or with which the said composition to be treated is in direct contact, is the anode.

8. A process according to claim 1, wherein a current density of between 0.1 and 15 A/dm$^2$ is being applied in the vessel.

9. A process according to claim 8, wherein the current density is between 1 and 15 A/dm$^2$.

10. A process according to claim 1, wherein the electrode formed by the composition to be treated or with which the composition to be treated is in direct contact, operates alternately as the anode and as the cathode.

11. A process according to claim 1, wherein the composition is a catalyst with metal support.

12. A process according to claim 11, wherein the catalyst is a motor vehicle postcombustion catalyst with metal support.

13. A process according to claim 11, wherein the catalyst is worn or spent.

14. A process according to claim 11, wherein the catalyst is in the form of a monolith.

15. A process according to claim 1, wherein the layer of oxides is alumina-based.

16. A process according to claim 15, wherein the precious metals are selected from the group consisting of platinum, rhodium and palladium.

17. A process according to claim 1, wherein the precious metals are selected from the group consisting of platinum, rhodium and palladium.

18. A process according to claim 1, wherein the metal support is formed from a metal or a metal alloy.

19. A process according to claim 18, wherein the alloy is based on a metal selected from the group consisting of iron, chromium and aluminum.

* * * * *